(12) United States Patent
Morrill (10) Patent No.: US 9,777,636 B2
(45) Date of Patent: Oct. 3, 2017

(54) TURBINE CASE COOLING SYSTEM (71) Applicant: ROLLS-ROYCE PLC, London (GB)

(72) Inventor: Daniel Lawrence Morrill, Nottingham (GB)

(73) Assignee: ROLLS-ROYCE plc, London (GB)

( * ) Notice: Subject to any disclaimer, the term of this patent is extended or adjusted under 35 U.S.C. 154(b) by 273 days.

(21) Appl. No.: 14/734,754

(22) Filed: Jun. 9, 2015

(65) Prior Publication Data
US 2016/0003151 A1 Jan. 7, 2016

(30) Foreign Application Priority Data

Jul. 4, 2014 (GB) .................................. 1409991.5

(51) Int. Cl.
*F01D 25/14* (2006.01)
*F02C 7/18* (2006.01)
*F01D 11/24* (2006.01)

(52) U.S. Cl.
CPC ................ *F02C 7/18* (2013.01); *F01D 11/24* (2013.01); *F01D 25/14* (2013.01); *F05D 2260/201* (2013.01); *F05D 2270/42* (2013.01); *F05D 2270/44* (2013.01)

(58) Field of Classification Search
CPC . F02C 7/18; F01D 25/08; F01D 25/10; F01D 25/12; F01D 25/14; F01D 25/145; F01D 11/24; F05D 2260/201; F05D 2270/42; F05D 2270/44
See application file for complete search history.

(56) References Cited

U.S. PATENT DOCUMENTS

| 4,441,314 A | 4/1984 | Fitton |
| 5,351,732 A | 10/1994 | Mills et al. |
| 5,399,066 A * | 3/1995 | Ritchie ............... F01D 11/24 165/47 |
| 5,407,320 A | 4/1995 | Hutchinson |
| 6,227,800 B1 | 5/2001 | Spring et al. |

(Continued)

FOREIGN PATENT DOCUMENTS

| EP | 1148221 A2 | 10/2001 |
| EP | 1972884 A1 | 9/2008 |

(Continued)

OTHER PUBLICATIONS

Nov. 4, 2015 Search Report issued in European Patent Application No. 15170651.

(Continued)

*Primary Examiner* — Richard Edgar
(74) *Attorney, Agent, or Firm* — Oliff PLC (57) ABSTRACT

A turbine case cooling system including a turbine assembly having an inlet and an outlet and surrounded by a turbine casing. The turbine case cooling system is arranged to selectively impingement cool at least part of the turbine casing. The system includes an annular structure that is radially spaced from the turbine casing and includes a downstream end. The system includes an annular duct that is spaced radially outwardly from the turbine casing and radially inwardly from the annular structure. The duct is sealingly coupled to the turbine casing at a first end towards the turbine inlet, and a second end extends axially towards the downstream end of the annular structure and the turbine outlet.

13 Claims, 5 Drawing Sheets (56) References Cited

U.S. PATENT DOCUMENTS

| | | |
|---|---|---|
| 8,414,255 B2 | 4/2013 | Ireland et al. |
| 2007/0245739 A1 | 10/2007 | Stretton et al. |
| 2013/0156541 A1 | 6/2013 | Eleftheriou et al. |

FOREIGN PATENT DOCUMENTS

| | | |
|---|---|---|
| EP | 2236750 A2 | 10/2010 |
| EP | 2770168 A2 | 8/2014 |
| FR | 2965010 A1 | 3/2012 |
| WO | 92/11444 A1 | 7/1992 |

OTHER PUBLICATIONS

Dec. 5, 2014 Search Report issued in British Application No. GB1409991.5.

\* cited by examiner

TURBINE CASE COOLING SYSTEM

The present invention relates to a turbine case cooling system and, in particular, to a gas turbine engine having a turbine case cooling system.

Figure 1:
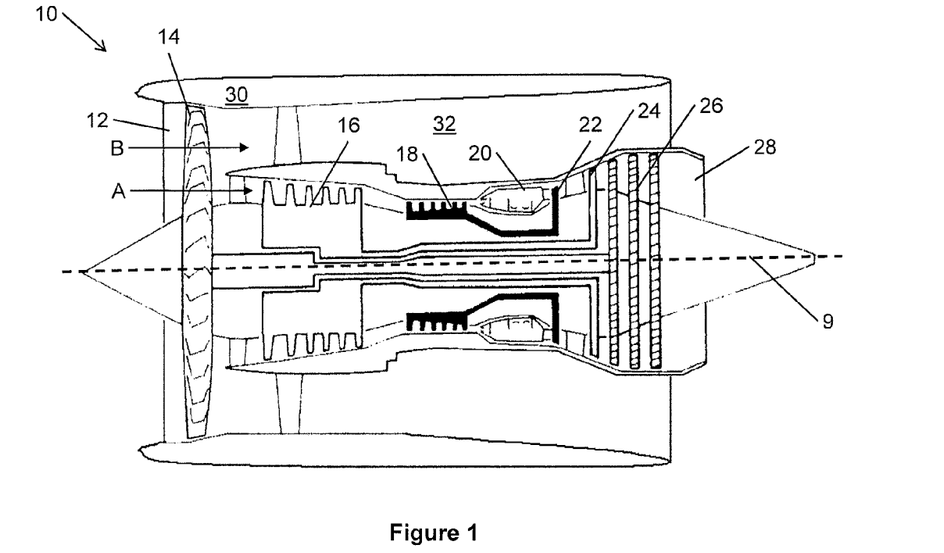
FIG. 1 is a sectional side view of a gas turbine engine.

A gas turbine engine 10 is shown in FIG. 1 and comprises a longitudinal rotational axis 9. The gas turbine engine 10 comprises an air intake 12 and a propulsive fan 14 that generates two airflows A and B. The gas turbine engine 10 comprises, in axial flow A, an intermediate pressure compressor 16, a high pressure compressor 18, a combustor 20, a high pressure turbine 22, an intermediate pressure turbine 24, a low pressure turbine 26 and an exhaust nozzle 28. A nacelle 30 surrounds the gas turbine engine 10 and defines, in axial flow B, a bypass duct 32.

A turbine case generally surrounds the high pressure turbine 22, intermediate pressure turbine 24 and low pressure turbine 26. The turbine case may be a single case extending axially around all three turbines 22, 24, 26 or individual turbine cases may be provided for each turbine 22, 24, 26. It is typically necessary to selectively cool at least some of the turbine case during some engine running conditions in order to reduce the clearance between the tips of the rotor blades of the turbine stage and the turbine case to improve engine performance. For this purpose it is known to supply an annular manifold around the turbine case axially aligned with the high pressure turbine 22. Such manifold is positioned in the fire zone radially outside the turbine case. Cooling air is directed from the manifold to cool the turbine case, for example by impingement cooling, and is then exhausted into the fire zone where it mixes with the airflow. A similar, separate annular manifold may be provided around the turbine case axially aligned with the intermediate pressure turbine 24. Similarly, its cooling air is exhausted into the fire zone after being used to cool the turbine case. A third, separate annular manifold may be provided around the turbine case axially aligned with the low pressure turbine 26.

One problem with this arrangement is that the flow exhausted from the turbine case cooling manifolds affects the pressurisation of the fire zone because turbine case cooling is not required at all engine running conditions. Thus, the requirements for fire extinguishing capability in the fire zone are dependent on the amount of turbine case cooling air being exhausted from the manifolds.

Another problem with this arrangement is that the turbine case cooling air flow from the manifolds is affected by the pressurisation of the fire zone because the air is either drawn through more quickly or impeded from exhausting into the fire zone dependent on whether the fire zone pressure is lower or higher than the manifold pressure.

A further problem with this arrangement is that the pressure of air exiting the fire zone at its rear nozzle can affect the pressure in the adjacent bypass nozzle, because the two nozzles terminate at different axial positions, and so may affect the overall performance of the engine.

The present invention provides a turbine case cooling system that seeks to address the aforementioned problems.

Accordingly the present invention provides a turbine case cooling system comprising:
a turbine assembly having an inlet and an outlet and surrounded by a turbine casing, wherein the turbine assembly comprises two or three turbine stages in axial series; the turbine case cooling system arranged to selectively impingement cool at least part of the turbine casing;
an annular structure that is radially spaced from the turbine casing and comprises a downstream end; and
an annular duct that is spaced radially outwardly from the turbine casing and radially inwardly from the annular structure; the duct sealingly coupled to the turbine casing at a first end towards the inlet of the axially first turbine stage of the turbine assembly, and a second end of the duct extending axially towards, to or beyond the downstream end of the annular structure and the outlet of the axially last of the turbine stages of the turbine assembly.

Advantageously the turbine case cooling system has an increased pressure drop and therefore a higher cooling capacity and flow per unit area than known arrangements. Another advantage is that the flow in the turbine case cooling system does not interfere with the flow in the adjacent fire zone or vice versa.

The second end of the duct may extend axially to or beyond the downstream end of the annular structure. Advantageously this causes the pressure drop in the turbine case cooling system to be controlled by the static pressure of the bypass flow adjacent to the exit to the annular duct.

Additionally or alternatively the second end of the duct may extend axially to or beyond the outlet of the turbine assembly. Advantageously this causes the pressure drop in the turbine case cooling system to be controlled by the static pressure at the outlet of the turbine assembly.

The turbine assembly may comprise one, two or three turbine stages in axial series. The first end of the annular duct may be sealingly coupled to the turbine casing towards the inlet of the axially first turbine stage and the second end of the annular duct may extend axially towards, to or beyond the outlet of the axially last of the turbine stages. Advantageously the annular duct defines a turbine case cooling chamber radially between the duct and the turbine casing which is separated from a flow zone radially outward of the duct.

The annular duct may comprise at least one manifold radially spaced from the turbine casing, the at least one manifold having impingement holes through its radially inner wall. Advantageously the at least one manifold provides impingement cooling fluid, for example air, to impingement cool at least part of the turbine casing. The annular duct may comprise two or three manifolds each radially spaced from the turbine casing and axially spaced from each other, each manifold having impingement holes through its radially inner wall.

Advantageously each manifold provides impingement cooling fluid, for example air, to impingement cool part of the turbine casing. The set of manifolds may provide impingement cooling fluid, for example air, to impingement cool substantially all of the turbine casing that requires cooling. Each manifold may be aligned with one of the turbine stages. Advantageously this means that impingement cooling fluid, for example air, is provided to impingement cool the hottest parts of the turbine casing which surround each turbine stage.

The turbine case cooling system may further comprise an active turbine case cooling supply arrangement. For example, the active turbine case cooling supply arrangement may comprise a source, such as a bleed from a compressor stage of a gas turbine engine, one or more valves to connect or disconnect the source from the manifold or manifolds, and a controller to control the one or more valves. The valves may be binary, that is open or closed, or may be multi-state or fully variable. The controller may be a dedicated controller or may be a function of another controller, such as an engine controller (engine electronic controller, EEC). Other arrangements of active control of turbine case cooling supply are encompassed within the scope of the present invention.

Alternatively the turbine case cooling system may further comprise a passive turbine case cooling supply arrangement. For example, the passive turbine case cooling supply arrangement may comprise a source, such as a bleed from a compressor stage of a gas turbine engine and one or more valves to connect or disconnect the source from the manifold or manifolds. The valves may be binary, that is open or closed, or may be multi-state or fully variable. The valves are arranged to open and close automatically, that is without a controller instructing the movement. For example, the valves could be activated by fluid pressure in the manifolds acting on them. Other arrangements of passive control of turbine case cooling supply are encompassed within the scope of the present invention.

The annular duct may comprise at least one vent passage therethrough in a direction having a radially outward component. There may be an annular array of vent passages through the annular duct. There may be an axial array of vent passages through the annular duct. There may be more than one annular array of vent passages through the annular duct, the arrays being axially spaced from each other. Advantageously such vent passages may enable the turbine case cooling chamber defined by the annular duct and turbine casing to be considered as the same fire zone as the flow zone radially outside the annular duct without significantly altering the flows in each annular space.

The annular structure may be configured to define a radially inner surface of a bypass duct and may be configured to define a flow zone with the annular duct. The flow zone may comprise a fire zone.

The annular structure may extend axially to or beyond the outlet of the turbine assembly. Advantageously the turbine case cooling system is therefore applicable to a wide variety of engines, for example gas turbine engines having low or high bypass ratios.

The present invention also provides a gas turbine engine comprising the turbine case cooling system as described.

Any combination of the optional features is encompassed within the scope of the invention except where mutually exclusive.

The present invention will be more fully described by way of example with reference to the accompanying drawings, in which.

In all the figures the general airflow direction is from left to right. Thus components drawn towards the left of any of the figures may be referred to as 'upstream' and those further towards the right of any of the figures may be referred to as 'downstream'.

Figure 2:
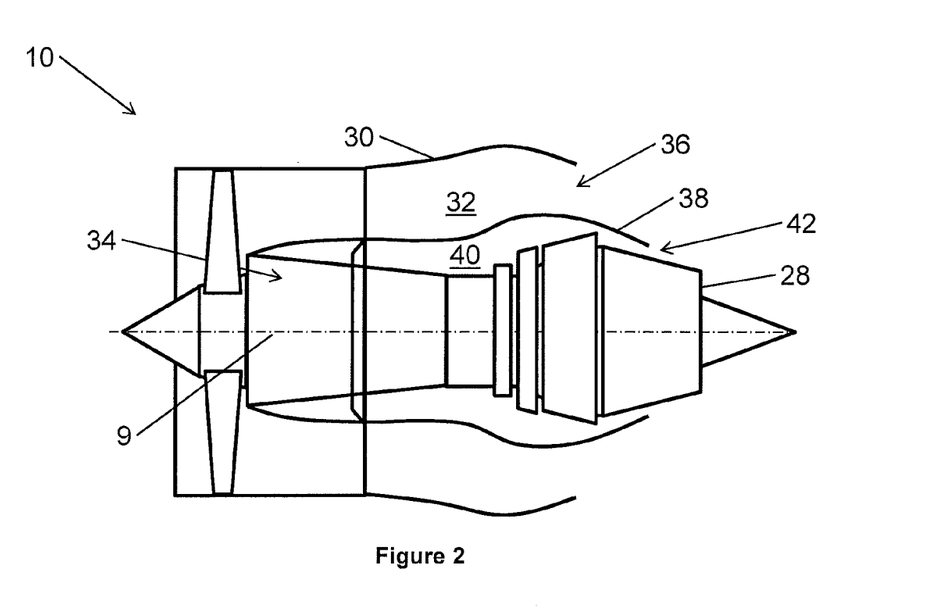
FIG. 2 is a schematic side view of a gas turbine engine.

In FIG. 2 the gas turbine engine 10 comprises a core engine 34 that includes the compressors 16, 18, combustor 20, and turbines 22, 24, 26. The core engine 34 has the exhaust nozzle 28, sometimes referred to as the hot nozzle, at its axially downstream end at the exit of the high pressure turbine 26. Radially outside and spaced from the core engine 34 is the nacelle 30 which partially defines the bypass duct 32. At the axially downstream end of the bypass duct 32 is a bypass nozzle 36, sometimes referred to as the cold nozzle. The radially inner extent of the bypass duct 32 is defined by an annular structure 38. The annular structure 38 may extend axially rearwards beyond the bypass nozzle 36.

The annular space that is radially between the core engine 34 and the annular structure 38 defines a flow zone 40. The flow zone 40 comprises a flow zone nozzle 42 at its axially downstream end. The flow zone nozzle 42 is defined by the most axially rearward portion of the annular structure 38 and the radially outer surface of the exhaust nozzle 28.

The flow zone 40 is configured for ingress of ventilation air bled from the bypass duct 32 which flows through the flow zone 40 and is expelled through the flow zone nozzle 42 in order to maintain a purge flow through the flow zone 40. The flow zone 40 may be configured as a fire zone; that is, it is configured to contain any fire that begins in the zone and/or to retard the progress of fire into or out of the zone. Such fire zones are precautionary safety features for managing rare fire events.

The air pressure in the flow zone 40 is not constant. For example, it is affected by the amount of air bled from the bypass duct 32 to purge it, by discharge from the pre-cooler of the cabin bleed system and by bypass flow from the bypass nozzle 36.

Figure 3:
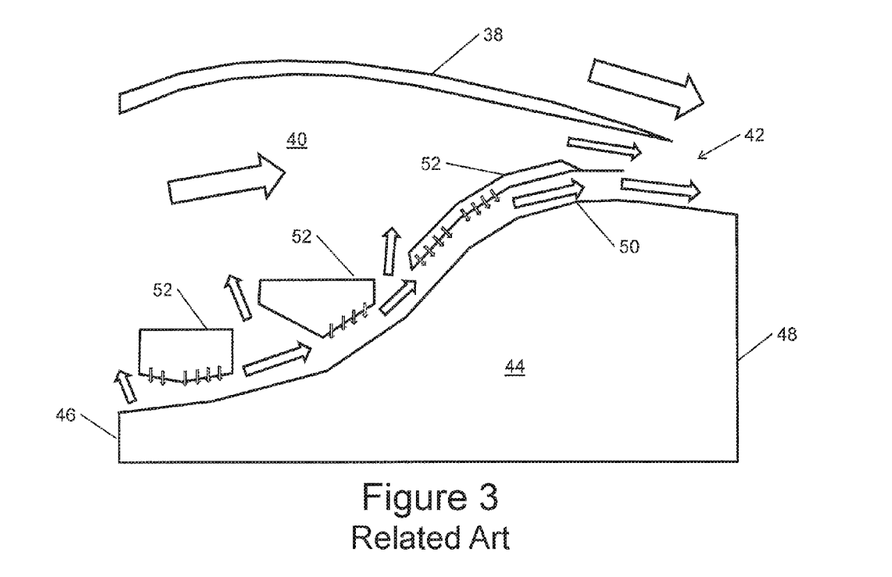
FIG. 3 is a schematic enlargement of part of the turbine arrangement according to a known arrangement of turbine case cooling.

FIG. 3 shows an enlargement of part of a known turbine assembly 44 which shares some common features with the present invention. The turbine assembly 44 has an inlet 46 and an outlet 48 at its axially upstream and downstream ends respectively. The turbine assembly 44 is radially enclosed by turbine casing 50. The turbine assembly 44 may comprise one, two or three turbine stages such as the high pressure turbine 22, intermediate pressure turbine 24 and low pressure turbine 26. The turbine casing 50 may be a single annular component that extends axially from the inlet 46 to the outlet 48 of the turbine assembly 44. Alternatively the turbine casing 50 may be axially segmented so that there are two or more axial portions, for example one portion for each turbine stage 22, 24, 26. Such a segmented turbine casing 50 comprises suitable sealing between the axial portions to prevent egress of working fluid from the core engine 34 gas path into the flow zone 40.

Radially outside the turbine casing 50 and spaced therefrom by a small distance are a plurality of manifolds 52. Each manifold 52 is axially aligned with one of the turbine stages 22, 24, 26. The manifolds 52 are arranged to provide cooling air to impingement cool a portion of the turbine casing 50 through impingement cooling holes in their radially inwardly directed surfaces. There is an annular gap between pairs of manifolds 52 through which cooling air is expelled into the flow zone 40 after it impinges on the turbine casing 50. Some cooling air is entrained to flow downstream along the turbine casing 50 after impinging on a portion of the turbine casing 50.

The impingement cooling air provided by the most axially downstream manifold 52, for example that manifold axially aligned with the low pressure turbine 26, flows downstream parallel to the turbine casing 50 and mixes with the air in the flow zone 40 before being expelled through the flow zone nozzle 42. Thus at engine conditions where there is significant cooling flow provided to the manifolds 52, the amount of flow expelled through the flow zone nozzle 42 may be greater than at other engine conditions and so the pressure in the flow zone 40 is higher than at other engine conditions and may thus cause a reduction in the bypass flow radially outside the flow zone nozzle 42.

Figure 4:
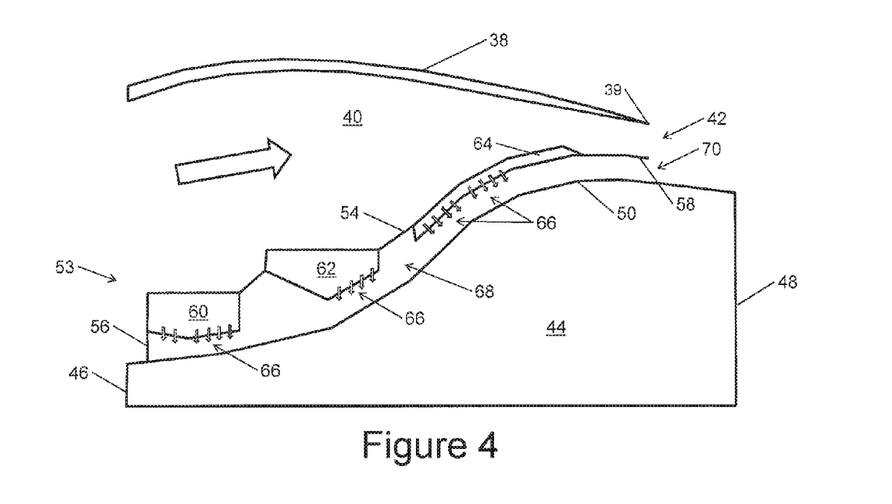
FIG. 4 is a schematic enlargement of part of the turbine arrangement according to one aspect of the present invention.

A turbine case cooling system 53 is described with respect to FIG. 4. FIG. 4 shows an enlargement of part of a turbine assembly 44 which shares some common features with that described with respect to FIG. 3. Thus the turbine assembly 44 has an inlet 46 and an outlet 48 at its axially upstream and downstream ends respectively. The turbine assembly 44 is radially enclosed by turbine casing 50. The turbine assembly 44 may comprise one, two or three turbine stages such as the high pressure turbine 22, intermediate pressure turbine 24 and low pressure turbine 26. The turbine casing 50 may be a single annular component that extends axially from the inlet 46 to the outlet 48 of the turbine assembly 44. Alternatively the turbine casing 50 may be axially segmented so that there are two or more axial portions, for example one portion for each turbine stage 22, 24, 26. Such a segmented turbine casing 50 comprises suitable sealing between the axial portions to prevent egress of working fluid from the core engine 34 gas path into the flow zone 40.

Radially outside the turbine casing 50 and spaced therefrom by a small distance is an annular duct 54. The annular duct 54 is sealingly coupled at its first end 56 to the turbine casing 50 towards the inlet 46 of the turbine assembly 44. Advantageously this prevents impingement cooling air being expelled into the flow zone 40 in an upstream direction. The annular duct 56 extends axially downstream and approximately follows the contours of the turbine casing 50. A second end 58 of the annular duct 54 is axially aligned with a downstream end 39 of the annular structure 38 or extends further axially downstream than the downstream end 39 of the annular structure 38. Thus the plane of the second end 58 of the annular duct 54 is common with or further downstream than the plane of the downstream end 39 of the annular structure 38. The outlet 48 of the turbine assembly 44 is axially further downstream than the downstream end 39 of the annular structure 38 or the second end 58 of the annular duct 54.

The annular duct 54 forms part of the turbine case cooling system 53 to enable selective impingement cooling of at least part of the turbine casing 50. One manner in which it may provide impingement cooling is by the provision of one or more annular impingement cooling air manifolds. Preferably there is more than one annular manifold, each manifold being axially aligned with one of the turbine stages 22, 24, 26. Thus a high pressure manifold 60 is axially aligned with the high pressure turbine 22; an intermediate pressure manifold 62 is axially aligned with the intermediate pressure turbine 24; and a low pressure manifold 64 is axially aligned with the low pressure turbine 26. Alternatively one manifold 60, 62, 64 may be axially aligned with more than one turbine stage 22, 24, 26. The manifolds 60, 62, 64 are arranged to provide cooling air to impingement cool a portion of the turbine casing 50 through impingement cooling holes 66 in their radially inwardly directed walls. Some cooling air from each manifold 60, 62, 64 is entrained to flow downstream along the turbine casing 50 after impinging on a portion of the turbine casing 50.

It should be understood that the terms 'radially inner wall', 'radially outer wall' and suchlike refer to the major direction of the plane of the wall. Since the manifolds 60, 62, 64 are arranged to follow the contour of the turbine casing 50 some of the radially inner walls have an axial component so that they are actually directed at an angle to the longitudinal axis 9 of the gas turbine engine 10 and describe the surface of a cone.

The manifolds 60, 62, 64 are each integrally formed with or coupled to the annular duct 54 such that their radially outer walls are common with, formed by or coupled to the annular duct 54. The radially inner walls of the manifolds 60, 62, 64 are spaced inwardly from the annular duct 54 but maintain a small radial gap from the turbine casing 50 to enable impingement cooling air to be expelled through the impingement cooling holes 66. The impingement cooling holes 66 form an array having any suitable pattern and spacing of impingement cooling holes 66 covering some or all of the radially inner wall of each manifold 60, 62, 64. Each manifold 60, 62, 64 may have additional circumferentially and radially extending side walls to join their radially inner and outer walls. For example, the upstream side wall of the high pressure manifold 60 may be partially integrally formed by, common with or coupled to the first end 56 of the annular duct 54.

Advantageously the annular duct 54 comprises one, two or three impingement cooling air manifolds 60, 62, 64, each preferably axially aligned with a turbine stage 22, 24, 26 of the turbine assembly 44. Since the annular duct 54 is axially and circumferentially continuous all the impingement cooling air is constrained to travel downstream in the turbine case cooling chamber 68, thereby providing some convective cooling of downstream portions of the turbine casing 50. The second end 58 of the annular duct 54 and the radially outer surface of the turbine casing 50 forms a turbine case cooling nozzle 70 through which all the impingement cooling air is expelled.

The flow expelled through the turbine case cooling nozzle 70 is predominantly driven by the flow through the bypass duct 32 because the pressure of the flow in the bypass duct 32 is lower than the static pressure at the turbine case cooling nozzle 70. This is because the second end 58 of the annular duct 54 is axially aligned with or downstream of the downstream end 39 of the annular structure 38 but upstream of the outlet 48 of the turbine assembly 44. Thus the flow expelled from the turbine case cooling chamber 68 through the turbine case cooling nozzle 70 is controlled by the pressure of the bypass flow and is substantially mixed therewith before interacting with the core flow from the outlet 48 of the turbine assembly 44.

Advantageously there is no mixing of the impingement cooling air from the turbine case cooling chamber 68 with the air in the flow zone 40, until downstream of the turbine case cooling nozzle 70, because the annular duct 54 entirely separates the two spaces. A further benefit of the present invention is that the pressure in the flow zone 40 does not affect the pressure of the turbine case cooling air in the turbine case cooling chamber 68, and neither does the pressure in the turbine case cooling chamber 68 affect the pressure in the flow zone 40 so the fire extinguishing requirements are simplified. The annular structure 38 may be made lighter as the pressure in the flow zone 40 is reduced relative to known arrangements such as that shown in FIG.

3. Consequently weight may be reduced which has a beneficial effect on the amount of fuel burnt for any engine run (specific fuel capacity).

Figure 5:
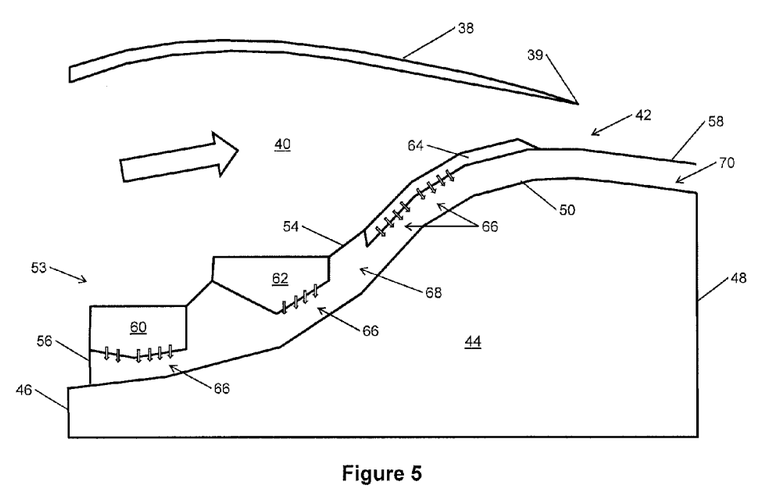
FIG. 5 is a schematic enlargement of part of the turbine arrangement according to another aspect of the present invention.

FIG. 5 shows a similar arrangement to that in FIG. 4, except that the second end 58 of the annular duct 54 extends axially beyond the downstream end 39 of the annular structure 38. The second end 58 of the annular duct 54 is axially aligned with the outlet 48 of the turbine assembly 44. Thus the plane of the second end 58 of the annular duct 54 is common with or further downstream than the plane of the outlet 48 of the turbine assembly 44.

In the arrangement of FIG. 5 the flow out of the turbine case cooling nozzle 70 is controlled by the flow from the turbine assembly 44 because the static pressure at the outlet 48 of the turbine assembly 44 is lower than the static pressure at the turbine case cooling nozzle 70. Advantageously this increases the pressure drop through the turbine case cooling system 53 and therefore increases the flow per unit area and the cooling capacity without increasing the size of the manifolds 60, 62, 64.

Figure 6:
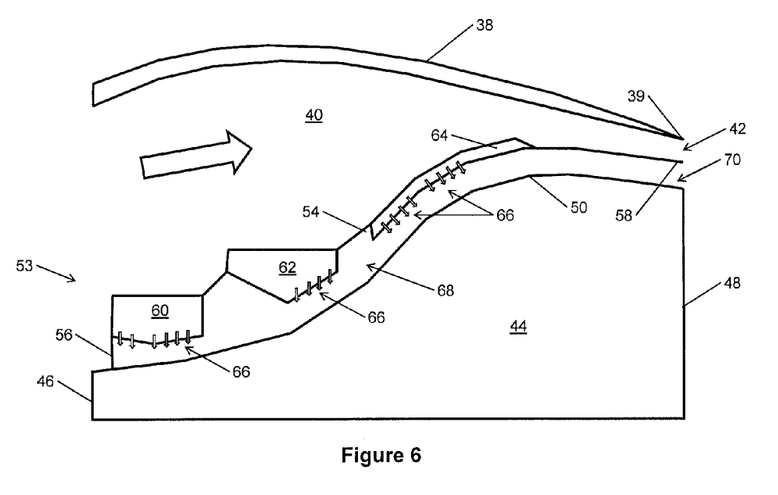
FIG. 6 is a schematic enlargement of part of the turbine arrangement according to another aspect of the present invention.

FIG. 6 shows a further arrangement in which the second end 58 of the annular duct 54 is axially aligned with both the downstream end 39 of the annular structure 38 and the outlet 48 of the turbine assembly 44. In this arrangement the flow through the turbine case cooling nozzle 70 is controlled by both the flow through the bypass nozzle 36 and the flow through the outlet 48 of the turbine assembly 44 since both these flows have lower static pressure than the static pressure at the turbine case cooling nozzle 70. Advantageously, the reduction in static pressure at the turbine case cooling nozzle 70 is greater and is more consistent in this arrangement.

Figure 7:
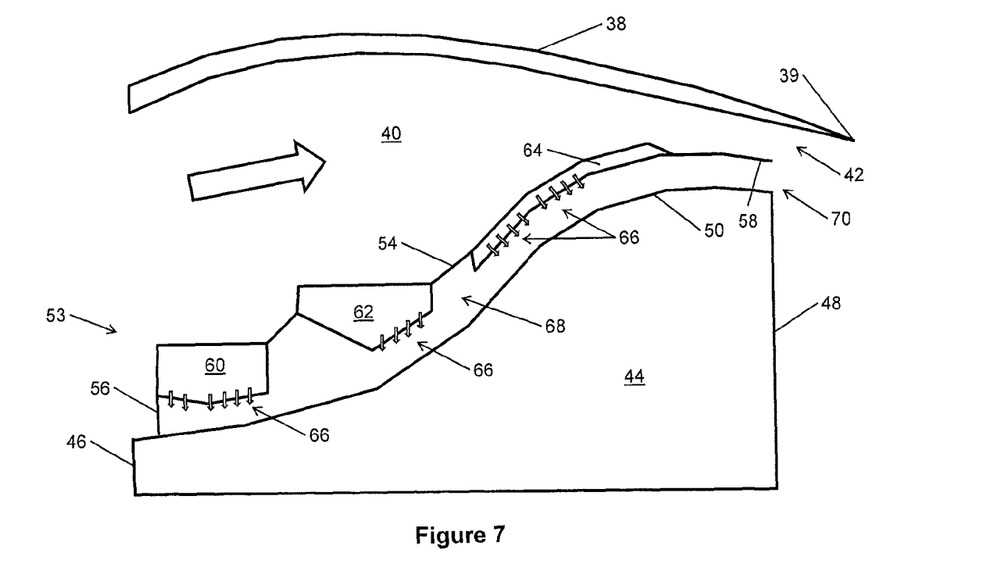
FIG. 7 is a schematic enlargement of part of the turbine arrangement according to another aspect of the present invention.

FIG. 7 shows an arrangement where the downstream end 39 of the annular structure 38 extends axially beyond the outlet 48 of the turbine assembly 44. The second end 58 of the annular duct 54 is axially aligned with the outlet 48 of the turbine assembly 44. In this arrangement the flow through the turbine case cooling nozzle 70 is controlled by the flow through the outlet 48 of the turbine assembly 44 since this flow has a lower static pressure than the static pressure at the turbine case cooling nozzle 70. In some applications the flow through the outlet 48 of the turbine assembly 44 has preferable characteristics compared to the flow radially outside the annular structure 38.

Figure 8:
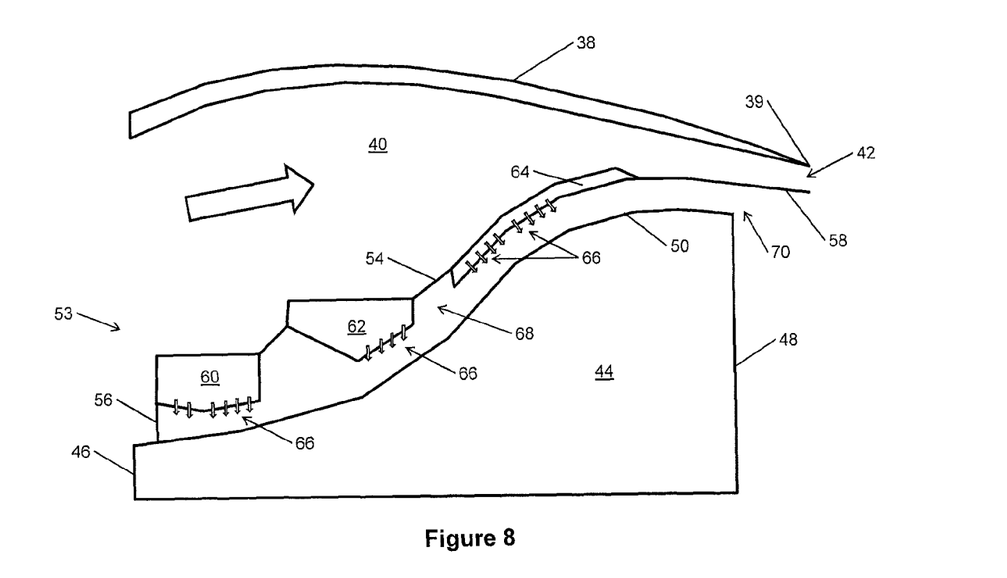
FIG. 8 is a schematic enlargement of part of the turbine arrangement according to another aspect of the present invention.

FIG. 8 is similar to FIG. 7 except that the second end 58 of the annular duct 54 extends beyond the outlet 48 of the turbine assembly 44 to be axially towards or aligned with the downstream end 39 of the annular structure 38. The static pressure of the turbine case cooling nozzle 70 is, nevertheless, controlled by the static pressure at the outlet 48 of the turbine assembly 44.

In a further arrangement the second end 58 of the annular duct 54 may extend axially further than the downstream end 39 of the annular structure 38 and the outlet 48 of the turbine assembly 44. The downstream end 39 of the annular structure 38 and the outlet 48 of the turbine assembly 44 may be arranged as in FIG. 5, FIG. 6 or FIG. 8. The flow through the outlet 48 and the flow through the flow zone nozzle 42 both attach to the surface of the second end 58 of the annular 54 and therefore the amount of static pressure reduction at the turbine case cooling nozzle 70 is improved and it is more consistent.

Preferably where the annular duct 54 extends beyond the outlet 48 of the turbine assembly 44, the annular structure 38 also extends beyond the outlet 48 of the turbine assembly 44, for example so that its axially downstream end is in approximately the same plane as the second end 58 of the annular duct 54. A further advantage in this arrangement is that the effect of the turbine case cooling flow on the bypass flow is reduced because the diameter of the flow through the turbine case cooling nozzle 70 is reduced.

Advantageously, the flow per unit area is increased through the turbine case cooling chamber 68 defined by the annular duct 54 and the turbine casing 50. Thus the flow capacity, and thus the cooling capacity, of the turbine case cooling system 53 is improved without increasing the component sizes. This is because the pressure drop through the turbine case cooling chamber 68 is increased by the adjacent flow, either of bypass air or flow through the turbine outlet 48 or both flows in the arrangement shown in FIG. 6.

The turbine case cooling system 53 described may further comprise a turbine case cooling supply arrangement to supply impingement cooling air to the or each of the manifolds 60, 62, 64. The turbine case cooling supply arrangement may be an active turbine case cooling supply arrangement, such as one or more air valves activated by an active control signal to supply cooling air into the manifolds 60, 62, 64 at predetermined engine conditions. Alternatively the turbine case cooling supply arrangement may be a passive turbine case cooling supply arrangement, such as one or more air valves activated by the pressure across the valve to supply cooling air into the manifolds 60, 62, 64 at predetermined engine conditions. Other active or passive turbine case cooling supply arrangements may be substituted with equal felicity as are well known in the field of turbine case cooling.

A further advantage of the present invention is that heat transfer from the turbine assembly 44 to the flow zone 40 and the annular structure 38 is reduced. This is because the annular duct 54 is axially and circumferentially continuous so there is no radiation gap between the manifolds 60, 62, 64. Advantageously this may enable the temperature requirements for components in this area of the gas turbine engine 10 to be reduced.

Although the present invention has been described in relation to a three-shaft gas turbine engine 10 it is equally applicable to a two-shaft gas turbine engine. In this application there is a high pressure turbine 22 and a low pressure turbine 26 but no intermediate pressure turbine 24. Thus there may be one manifold 60 aligned with one or both of the turbine stages 22, 26 or two manifolds 60, 64 each aligned with one of the turbine stages 22, 26.

The present invention is also applicable to a single-shaft gas turbine engine 10 having a power turbine. In this application there may be a single manifold 60 axially aligned with the single turbine stage forming the turbine assembly 44. The annular duct 54 may also extend to or beyond the downstream end of the power turbine and include one or more manifolds 60, 64 to supply impingement cooling air through impingement cooling holes 66 to cool at least parts of the turbine casing 50 surrounding the turbine stage and the power turbine.

The present invention is also applicable to a two- or three-shaft gas turbine engine 10 having a power turbine stage in similar manner.

Figure 9:
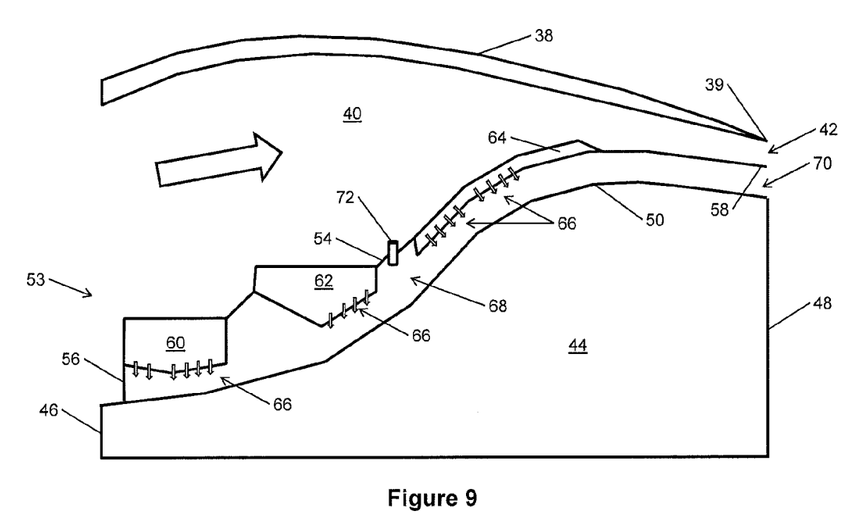
FIG. 9 is similar to FIG. 6 and shows a further optional aspect of the present invention.

Although the described embodiment of the annular duct 54 is axially and circumferentially continuous it may be advantageous in some applications to provide at least one vent passage 72 in a direction having a radially outward component through the annular duct 54. This is shown in FIG. 9 which is otherwise the same as FIG. 6. However, the vent passage 72 may be applied to any of the arrangements discussed herein.

The at least one vent passage 72 may be positioned at any suitable axial position but may preferably be downstream of at least one of the impingement cooling air manifolds 60, 62, 64. There may be an annular array of vent passages 72. Alternatively or additionally there may be at least one vent passage 72 or an annular array of vent passages 72 provided at more than one axial position. The purpose of the at least one vent passage 72 is to enable a small amount of the impingement cooling air to be expelled from the turbine case cooling chamber 68 into the flow zone 40. Beneficially the amount of air expelled is small so the pressures in both the turbine case cooling chamber 68 and the flow zone 40 remain substantially unaffected.

A further advantage of providing at least one vent passage 72 is that it introduces turbulence in the otherwise laminar flow through the turbine case cooling chamber 68 downstream of each manifold 60, 62, 64. Beneficially this increases heat transfer. Provision of the at least one vent passage 72 may also prevent the turbine case cooling chamber 68 being treated as a separate fire zone from the flow zone 40 and thus may reduce the requirements on wall thickness and construction materials for the annular duct 54.

The invention claimed is:

1. A turbine case cooling system comprising:
   a turbine assembly having an inlet and an outlet and surrounded by a turbine casing, wherein the turbine assembly comprises two or three turbine stages in axial series; the turbine case cooling system arranged to selectively impingement cool at least part of the turbine casing;
   an annular structure that is radially spaced from the turbine casing and comprises a downstream end; and
   an annular duct that is spaced radially outwardly from the turbine casing and radially inwardly from the annular structure; the duct sealingly coupled to the turbine casing at a first end towards the inlet of the axially first turbine stage of the turbine assembly, and a second end of the duct extending axially to or beyond the downstream end of the annular structure and extending axially towards, to or beyond the outlet of the axially last of the turbine stages of the turbine assembly.

2. A turbine case cooling system as claimed in claim 1 wherein the second end of the duct extends axially to or beyond the outlet of the turbine assembly.

3. A turbine case cooling system as claimed in claim 1 wherein the annular duct comprises at least one manifold radially spaced from the turbine casing, the at least one manifold having impingement holes through its radially inner wall.

4. A turbine case cooling system as claimed in claim 3 wherein the annular duct comprises two or three manifolds each radially spaced from the turbine casing and axially spaced from each other, each manifold having impingement holes through its radially inner wall.

5. A turbine case cooling system as claimed in claim 3 wherein each manifold is aligned with one of the turbine stages.

6. A turbine case cooling system as claimed in claim 1 wherein the turbine case cooling system further comprises an active turbine case cooling supply arrangement.

7. A turbine case cooling system as claimed in claim 1 wherein the turbine case cooling system further comprises a passive turbine case cooling supply arrangement.

8. A turbine case cooling system as claimed in claim 1 wherein the annular duct comprises at least one vent passage therethrough in a direction having a radially outward component.

9. A turbine case cooling system as claimed in claim 1 wherein the annular structure is configured to define a radially inner surface of a bypass duct and is configured to define a flow zone with the annular duct.

10. A turbine case cooling system as claimed in claim 9 wherein the flow zone comprises a fire zone.

11. A turbine case cooling system as claimed in claim 1 wherein the annular structure extends axially to or beyond the outlet of the turbine assembly.

12. A gas turbine engine comprising the turbine case cooling system as claimed in claim 1.

13. A turbine case cooling system comprising:
    a turbine assembly having an inlet and an outlet and surrounded by a turbine casing, wherein the turbine assembly comprises two or three turbine stages in axial series; the turbine case cooling system arranged to selectively impingement cool at least part of the turbine casing;
    an annular structure that is radially spaced from the turbine casing and comprises a downstream end; and
    an annular duct that is spaced radially outwardly from the turbine casing and radially inwardly from the annular structure; the duct sealingly coupled to the turbine casing at a first end towards the inlet of the axially first turbine stage of the turbine assembly, and a second end of the duct extending axially towards, to or beyond the downstream end of the annular structure and extending axially to or beyond the outlet of the axially last of the turbine stages of the turbine assembly.

* * * * *